United States Patent
Cannon et al.

[11] Patent Number: 5,850,594
[45] Date of Patent: Dec. 15, 1998

[54] METHOD AND APPARATUS FOR EFFICIENTLY TRANSMITTING ADDRESSES AND MESSAGES FROM PORTABLE MESSAGING UNITS OVER A WIRELESS COMMUNICATION CHANNEL

[75] Inventors: Gregory Cannon; Nancy Cannon, both of Keller, Tex.

[73] Assignee: Motorola, Inc., Schaumburg, Ill.

[21] Appl. No.: 697,513

[22] Filed: Aug. 26, 1996

[51] Int. Cl.$^6$ ............................................................. H04B 7/26
[52] U.S. Cl. ........................ 455/31.3; 455/412; 455/419; 455/458; 340/825.22; 340/825.27; 340/825.44
[58] Field of Search ........................................... 455/412, 414, 455/415, 417, 458–460, 31.2, 31.3, 32.1, 38.1, 38.4, 564, 517, 419; 340/825.44, 311.1, 825.22, 825.27

[56] References Cited

U.S. PATENT DOCUMENTS

| | | | |
|---|---|---|---|
| 5,066,949 | 11/1991 | Breeden et al. | 340/825.44 |
| 5,257,307 | 10/1993 | Ise | 455/31.3 |
| 5,487,100 | 1/1996 | Kane | 340/825.44 |
| 5,630,207 | 5/1997 | Gitlin et al. | 455/38.4 |

*Primary Examiner*—Edward F. Urban
*Assistant Examiner*—Lee Nguyen
*Attorney, Agent, or Firm*—Charles W. Bethards

[57] ABSTRACT

A communication system (100) for providing two-way communication including a portable messaging unit (105) for sending a signal including a recipient alias over a wireless communication channel and a controller (110) for receiving the signal including the recipient alias. The controller (110) then transmits a message to an address that is designated by the recipient alias and that is longer than the recipient alias.

9 Claims, 9 Drawing Sheets

METHOD AND APPARATUS FOR EFFICIENTLY TRANSMITTING ADDRESSES AND MESSAGES FROM PORTABLE MESSAGING UNITS OVER A WIRELESS COMMUNICATION CHANNEL

FIELD OF THE INVENTION

This invention relates in general to systems including portable messaging units, and more specifically to portable messaging units for sending and receiving messages over wireless communication channels.

BACKGROUND OF THE INVENTION

Wireless communication systems typically provide messages to subscriber units, such as portable messaging units. With the advent of two-way messaging, portable messaging units have also been able to transmit to other portable units and to fixed devices, such as computers. Messages in the communication system are generally delivered and/or received over a wireless communication channel, which usually has a limited bandwidth that permits only a limited amount of information to be transmitted over the channel within a specified time interval. Therefore, it is desirable to keep messages transmitted over the wireless channel as short as possible.

However, subscribers to the communication system often wish to send and receive relatively long messages. Also, addresses indicative of recipient devices are sometimes quite lengthy. For instance, electronic mail standards usually require extensive header information that is unsuitable for transmission over a wireless channel of limited bandwidth. As a result, two-way messaging can unduly crowd communication systems, resulting in inefficient channel use and message delays.

Thus, what is needed is a way to provide more efficient messaging in a wireless communication system including portable messaging units.

DESCRIPTION OF A PREFERRED EMBODIMENT

Figure 1:
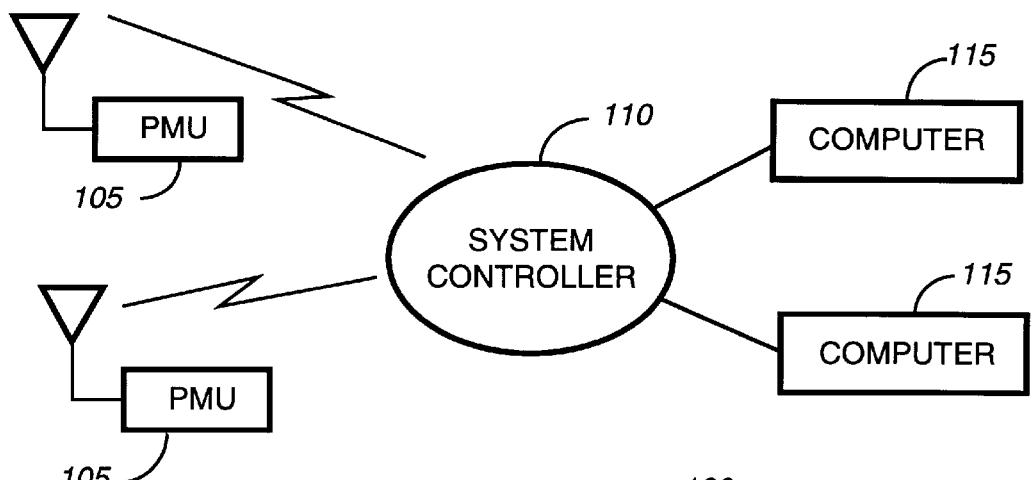
FIG. 1 is an illustration of a communication system including portable messaging units (PMUs) and a system controller according to the present invention.

FIG. 1 is an illustration of a communication system 100 for providing two-way communication between a system controller 110 and one or more portable messaging units (PMUs) 105, such as battery powered selective call receivers, over at least one wireless communication channel, e.g., at least one radio frequency communication channel. The system controller 110 can also be coupled to other types of devices, such as computers 115, by wireline communication links. Because radio frequency communication channels typically have limited bandwidths, only a limited amount of information can be transmitted over a channel within a specified time interval. Therefore, the communication system 100 according to the present invention employs relatively short aliases to communicate frequently transmitted information from the PMUs 105 to the system controller 110. Specifically, frequently used messages can be represented by message aliases, and addresses of recipients to whom messages are frequently send can be represented by recipient aliases. Such recipients can be referred to as "friends".

Databases of the frequently transmitted information and the associated aliases are preferably stored at the PMUs 105 and at the system controller 110 so that each device can recognize an alias and conveniently interpret the more lengthy message or friend address associated therewith. In accordance with a preferred embodiment of the present invention, the databases of both the system controller 110 and the PMUs 105 are updated, when necessary, by the controller 110 to avoid situations in which information stored in a PMU database is not equivalent to that stored in the controller database.

Figure 2:
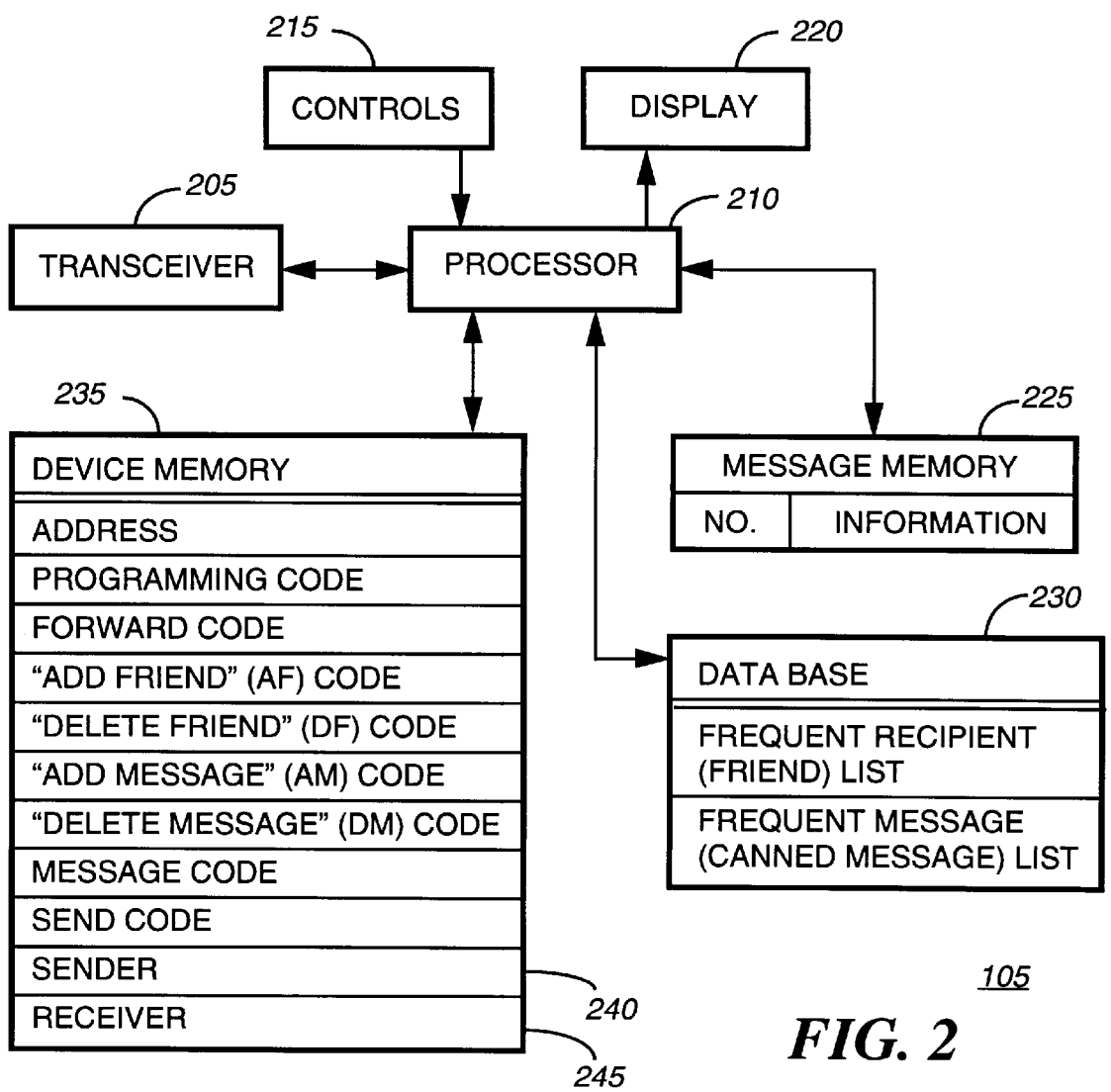
FIG. 2 is an electrical block diagram of a PMU included in the communication system of FIG. 1 according to the present invention.

FIG. 2 is an electrical block diagram of a PMU 105, which includes a transceiver 205 for sending and receiving information over a radio frequency communication channel and a processor 210 for controlling operations of the PMU 105. Controls 215 provide user-initiated signals to the processor 210, and a display 220 presents information to a user in response to activation by the processor 210. A message memory 225 is coupled to the processor 210 for storing received messages and message numbers associated with the received messages. Also, a database 230 is coupled to the processor 210 for storing the frequent recipient, i.e., friend, list and the frequent message list. Preferably, the lists in the database 230 are maintained in accordance with instructions by the user of the PMU 105 by over-the-air programming.

In accordance with the preferred embodiment of the present invention, each friend included in the friend list is associated with a recipient alias. More specifically, entries in the friend list include names of recipients, or friends, to whom messages are frequently sent and aliases of addresses associated with the friends. The addresses could also be included in the database 230, if desired. An entry in the friend list could, for instance, be as follows:

| Friend | Alias | Address |
|--------|-------|---------|
| Lou | 00011 | r_lou_b003@email.company.com@INTERNET |

According to the present invention, a friend list entry could include more than one recipient or even a group of people. Such an entry could be as follows:

| Friend(s) | Alias | Address(es) |
| --- | --- | --- |
| Lou, Jim, and Ed | 00011 | r_lou_b003@email.company.com@INTERNET<br>jim_l001@email.company.group.com<br>edward_g004@company.grp.com@INTERNET |

Similarly, each message included in the message list is associated with a message alias. These "canned messages" are also preferably associated with a message designation, which could be set by the user, so that the user can easily remember the message and select it for transmission by providing information to the processor 210 via the controls 215. An entry in the message list could, for example, include a number as a designator and be as follows:

| Message Designation | Alias | Canned Message |
| --- | --- | --- |
| 7 | 001010 | MEET ME IN THE CAFETERIA FOR COFFEE |

When messages entries are instead designated by a key word or words, an entry could be as follows:

| Message Designation | Alias | Canned Message |
| --- | --- | --- |
| Coffee | 001010 | MEET ME IN THE CAFETERIA FOR COFFEE |

As illustrated, the messages and the addresses to which the messages are transmitted by the PMU 105 can be relatively lengthy and unsuitable for frequent transmission over the radio communication channel. Therefore, in accordance with the present invention, the friend and message aliases are instead transmitted from the PMU 105 to the system controller 110 over the radio frequency communication channel to minimize the likelihood of channel crowding and resulting delays. Preferably, friend and message aliases comprise codes that include a predetermined number of bits, wherein the codes include a fewer number of characters than do the recipient addresses or the canned messages. By way of example, the friend aliases could comprise five-bit codes, thereby permitting storage of up to thirty-two friends. The message aliases could comprise six-bit codes, thereby permitting storage of up to sixty-four canned messages. It will be appreciated that different types of codes or different numbers of characters could alternatively be used for the aliases.

According to the present invention, the PMU 105 further includes a device memory 235 for storing device information, such as the address of the device. The device memory 235 also preferably stores a programming code for recognizing incoming programming information from the system controller 110 (FIG. 1), a forward code used for forwarding received messages to a friend, a message code used for sending and receiving messages, and a send code used for recognizing transmission commands received from the controls 215. Other codes for designating other transmitted and received signals include an "add friend" (AF) code, a "delete friend" (DF) code, an "add message" (AM) code, and a "delete message" code, as will be explained in greater detail below.

A sender 240 included in the PMU 105 prepares information for transmission from the PMU 105, and a receiver 245 processes received information. Preferably, the sender 240 and the receiver 245 comprise firmware stored in the device memory 235 and executed by the processor 210. Alternatively, the sender 240 and receiver 245 could be implemented using hardware capable of performing equivalent operations.

Figure 3:
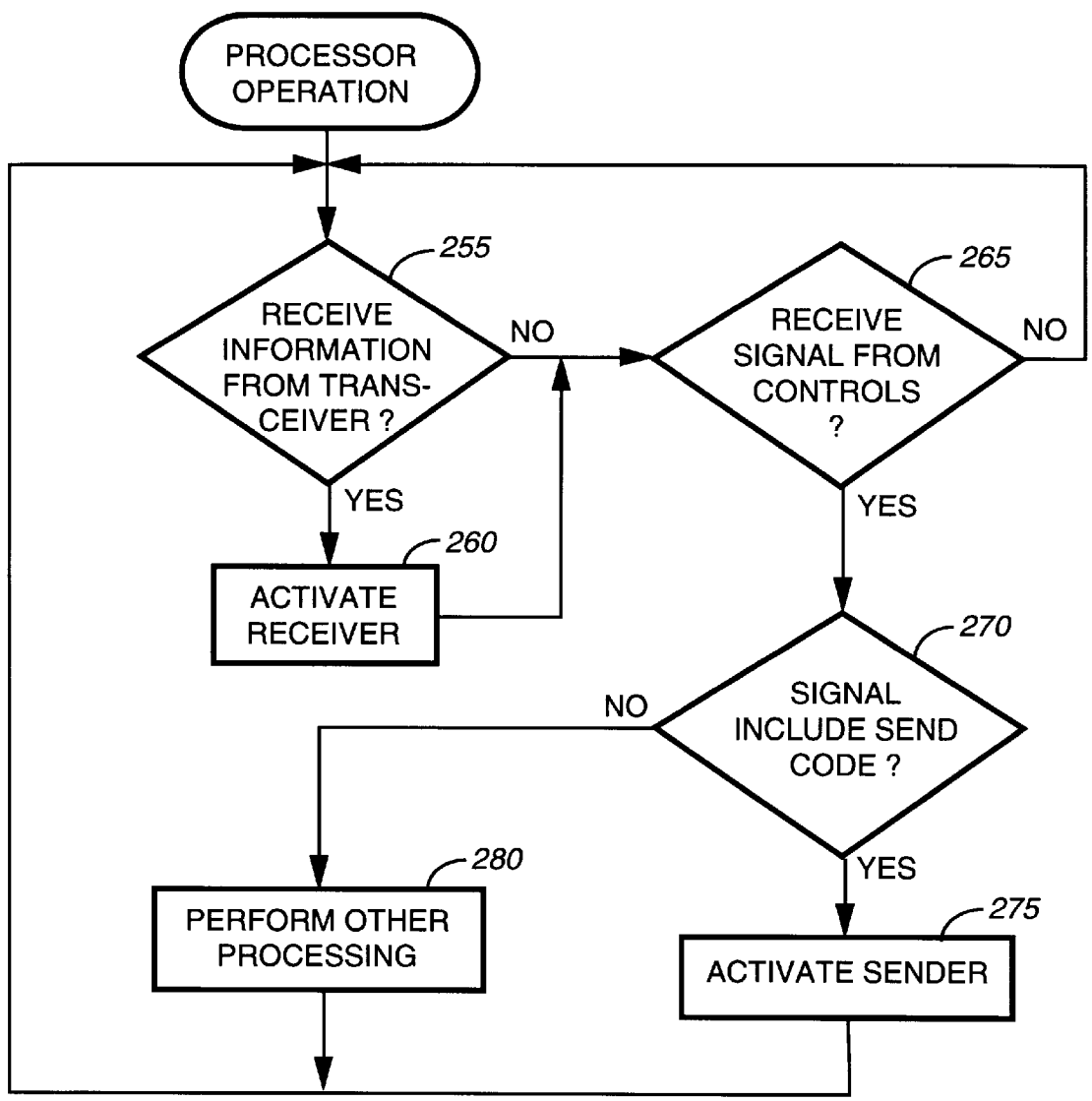
FIG. 3 is a flowchart of an operation of a processor included in the PMU of FIG. 2 according to the present invention.

FIG. 3 is a flowchart of an operation of the processor 210 according to the present invention. When, at step 255, information is received from the transceiver 205, the receiver 245 is activated, at step 260. When, at steps 265, 270, a signal is received from the controls 215, and the signal includes the send code, the sender 240 is activated, at step 275. When, at steps 265, 270, another type of signal is received from the controls 215, other processing is performed, at step 280, by the processor 210.

Figure 4:
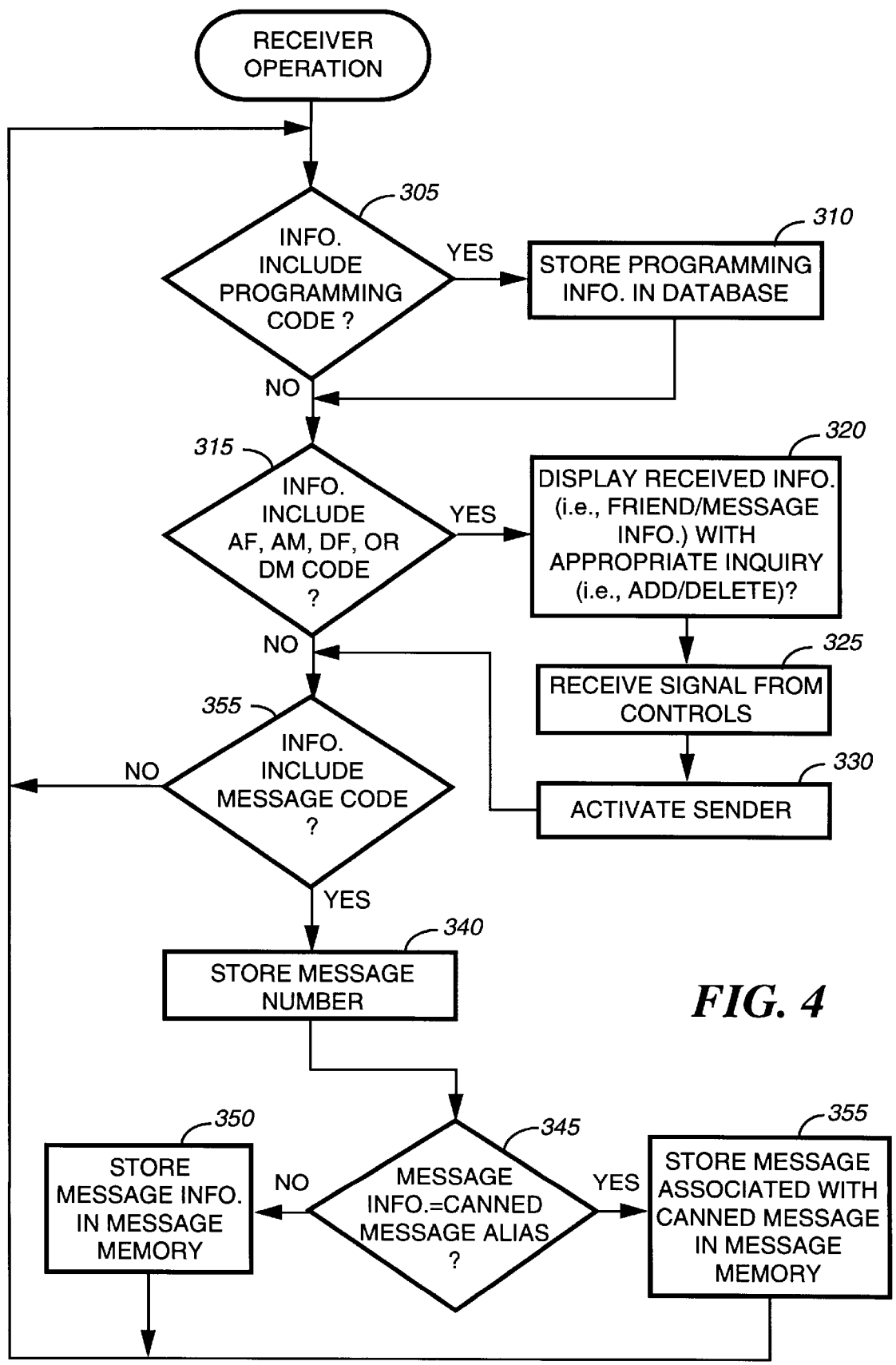
FIG. 4 is a flowchart of an operation of a receiver included in the PMU of FIG. 2 according to the present invention.

Referring next to FIG. 4, a flowchart illustrates an operation of the receiver 245. When, at step 305, the receiver 245 receives information including a programming code, the programming information is stored in the appropriate location of the database 230, at step 310. For instance, when the programming information includes an "add" command and friend or message information, the information is added to the friend or message list as instructed by the system controller 110. It will be appreciated that friend information could also be modified via over-the-air programming from the controller 110, such as by including modified information with an add command or by using a unique "modify" command. When the programming information includes a "delete" command and information by which a friend or message entry can be identified, the friend or message entry is deleted from the appropriate list.

At step 315, the received information could include an AF, AM, DF, or DM code directing the PMU 105 to inquire of the user whether a friend or message should be deleted or whether an additional alias, e.g., an additional recipient alias, should be added. In this case, at step 320, information received with the code is displayed, at step 320, on the display 220. When, for instance, the system controller 110 has received a communication from the PMU 105 and does not recognize an included friend or message alias, the controller 110 can transmit an inquiry to the PMU 105 asking whether a new friend or new message is to be added to a list stored in the database 230. When the system controller 110 receives a delete message (DM) command or a delete friend (DF) command from a different PMU in the communication system 100 (FIG. 1), the controller 110 could inquire as to whether the user of the PMU 105 would also like to delete the message or friend. For instance, when a particular user requests that a friend be deleted, an inquiry could automatically be provided to the "deleted" friend asking whether the user should also be deleted from the friend's list. When the friend answers in the affirmative, the system controller 110 could delete the user from the friend list associated with the PMU of the deleted friend. Once the inquiry is displayed, at step 320, the receiver 245 awaits the reception, at step 325, of a user-initiated signal indicating a response. Thereafter, at step 330, the sender 240 is activated, at step 330, to transmit the response to the system controller 110.

When, at step 335, the information received by the receiver 245 includes a message code, indicating that the system controller 110 is routing a message to the PMU 105 over the wireless communication channel, a message number associated with the message and included in the signal is stored, at step 340, in the message memory 225. The receiver 245 then compares, at step 345, the received message information with aliases stored in the message list. When the received message information is equivalent to a canned message alias, the message associated with the matching alias is retrieved from the list and stored, at step 355, in the message memory 225. Otherwise, the message information itself is stored in the message memory 225, at step 350. Thereafter, the message can be presented to the user in a conventional manner.

Figure 5:
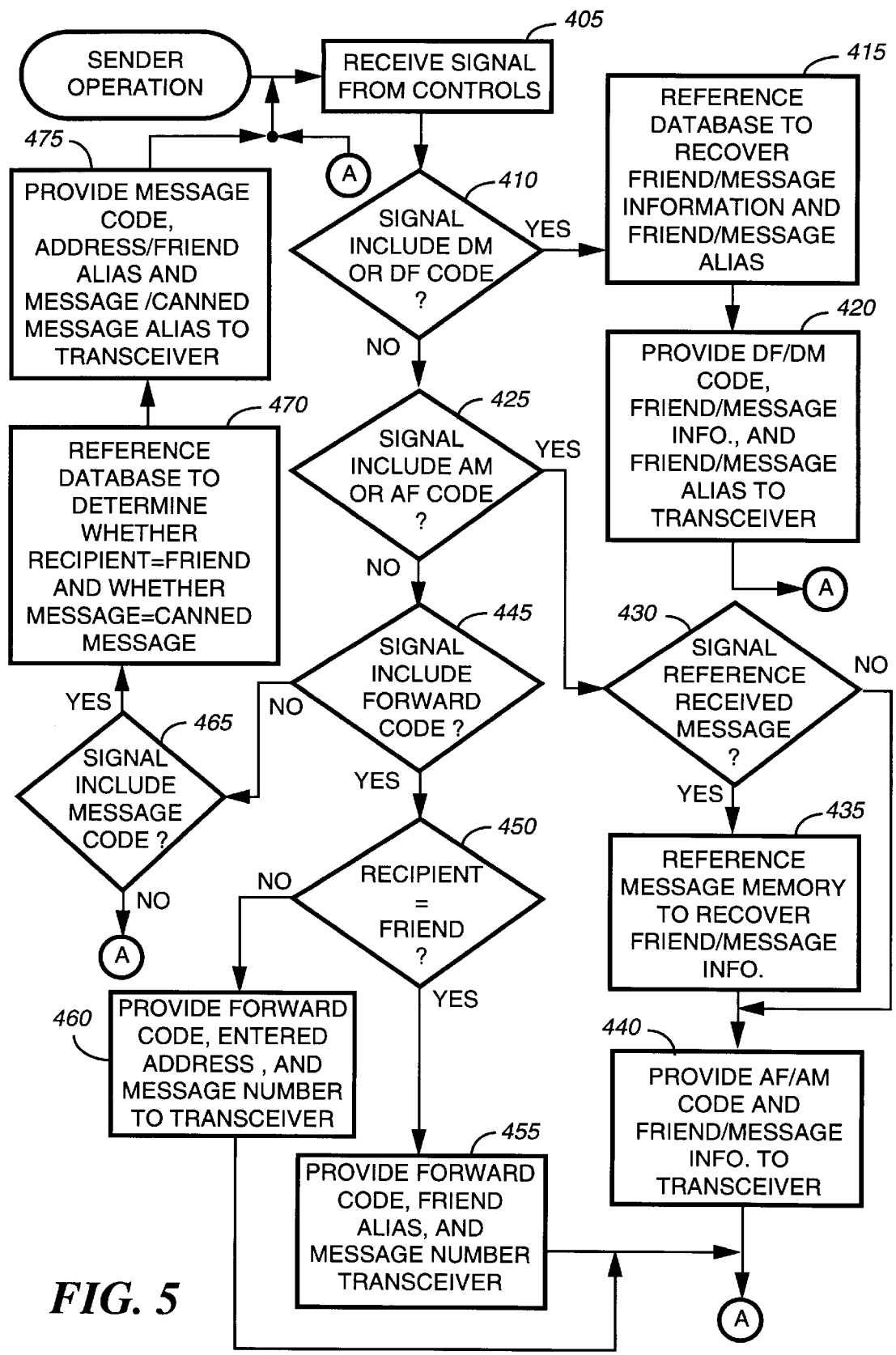
FIG. 5 is a flowchart depicting an operation of a sender included in the PMU of FIG. 2 according to the present invention.

FIG. 5 is a flowchart illustrating an operation of the sender 240 according to the present invention. At step 405, a signal is received from the controls 215. When, at step 410, the signal includes a DF or DM code, indicating that the user wants to delete a friend or message entry identified by the received user-initiated signal, the database 230 is referenced, at step 415, to recover the selected friend or message information and the alias associated therewith. The sender 240 then provides, at step 420, the appropriate DF or DM code to the transceiver 205 along with enough information to identify the entry that is to be deleted. For example, the alias and the entry information, such as friend name, friend address, message designation, and/or actual message, can be provided to the transceiver 205 with the DF or DM code to assist the controller 110 in locating the correct entry. As mentioned above, the controller 110, in response to receiving the code and related information, transmits programming information to the PMU 105 for updating the database 230.

When, at step 425, the user-initiated signal includes an AM or AF code, indicating that the user desires to add an additional message or friend to the database 230, the sender 240 further determines, at step 430, whether the signal references a previously received message. When the user-initiated signal does not reference a previously received message, the AF or AM code and the friend or message information which is to be entered into the database 230 is provided, at step 440, to the transceiver 205. When the signal references a previously received message, indicating that the message or the message originator is to be added to the database 230, sufficient identifying information, e.g., message number, friend information, actual message, or address information, is recovered from the message memory 225, at step 435, and provided to the transceiver 205 along with the AF or AM code, at step 440.

At step 445, reception of a signal including a forward code indicates that a previously received message is to be forwarded to another recipient. When, at step 450, the intended recipient is a friend, i.e., when the intended recipient is included in the friend list, the forward code, the friend alias, and the message number of the message to be forwarded are provided to the transceiver 205, at step 455. When the intended recipient is not included in the friend list of the PMU 105, the forward code, the message number, and an address entered by the user are provided, at step 460, to the transceiver 205.

When, at step 465, the signal includes a message code, indicating that a message is to be transmitted to another device, the sender 240 references, at step 470, the database 230 to determine whether the designated recipient is a friend and whether the entered message is a canned message. Thereafter, at step 475, the message code, the friend alias or recipient address, and the message information or message alias are provided to the transceiver 205.

Although the PMU 105 is described as transmitting one friend alias or one message alias to the system controller 110, it will be appreciated that more than one alias can be transmitted when the user so indicates. When, for instance, a message is to be transmitted to three friends that are not grouped under a single alias, aliases for each of the friends can be transmitted to the system controller 110.

As described above, the system controller 110 modifies the database 230 of the PMU 105 so that the lists stored in the controller 110 and the lists stored in the PMU 105 remain equivalent. However, one of ordinary skill will recognize that other methods for ensuring agreement between the PMU lists and the controller lists can alternatively be employed. By way of example, the user of the PMU 105 could add to, delete from, or modify the database 230 via the controls 215, in response to which AF, AM, DF, and DM codes and information could be automatically provided to the controller 110 to update the lists stored thereby.

Figure 6:
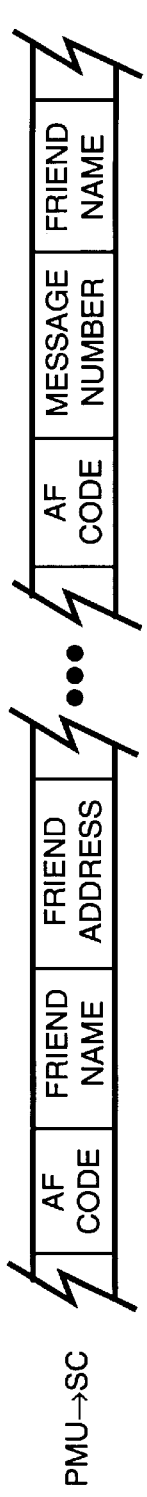
FIGS. 6–11 are signal diagrams illustrating signals provided between the PMU of FIG. 2 and the system controller of FIG. 1 according to the present invention.
Figure 7:
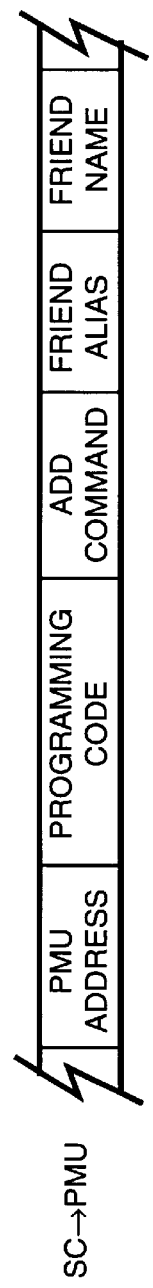

FIGS. 6–11 are signal diagrams illustrating signals communicated between the system controller 110 and the PMU 105 in accordance with the present invention. FIG. 6 depicts an example of information that could be sent by the PMU 105 to the system controller (SC) 110 to add a friend to the database 230 (FIG. 2). The information could include the AF code followed by the friend designation, e.g., name, and the friend address. When an originator of a previously received message is to be added to the friend list, a friend name and a message number associated with the previous message could simply be appended to the AF code, in which case the controller 110 could look up the previous message to assign a friend alias to the address of the message originator. FIG. 7 shows an example of a responsive signal provided by the controller 110 to the PMU 105. The responsive signal preferably comprises the PMU address, the programming code, and programming information, which includes at least an add command, an assigned friend alias, and the friend name for storage in the database 230 of the PMU 105. Rather than providing separate programming codes and add commands, it will be appreciated that a unique "add" programming code could be transmitted.

Figure 8:
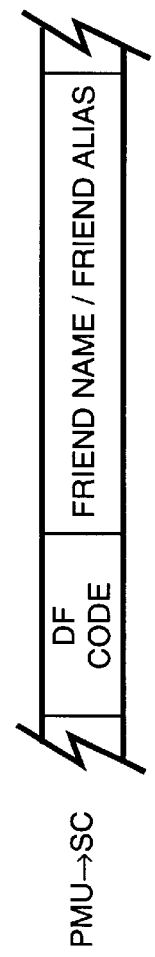
Figure 9:

In FIG. 8, the PMU 105 requests the deletion of a friend from its database 230 by sending the DF code followed by the entry identification information, which could include the friend alias and/or friend name. In response, as shown in FIG. 9, the controller 110 transmits the PMU address, the programming code, the delete command, and information indicative of the friend list entry, such as the alias of the friend. The processor 210 (FIG. 2) then deletes the friend from the database 230.

Figure 10:
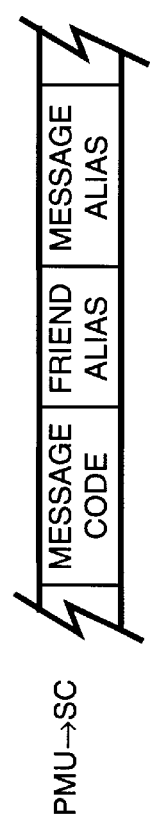
Figure 11:
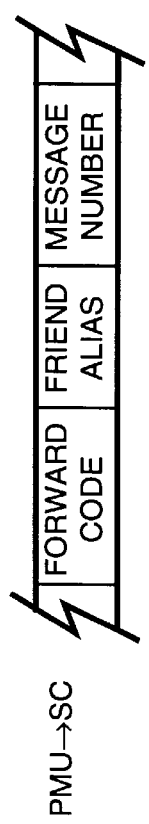

FIGS. 10 and 11 show examples of message transmissions from the PMU 105. In FIG. 10, the PMU 105 transmits a frequently transmitted message to a friend by sending the message code, the friend alias, and the message alias. The controller 110 receives the signal and decodes the friend alias and the message alias. The controller 110 then sends the message indicated by the message alias to an address associated with the friend alias. In FIG. 11, the PMU 105 forwards a previously received message to a friend by transmitting the forward code, the friend alias, and the number of the previous message. The controller 110, in response to receiving the forward signal, decodes the friend alias and looks up the message associated with the message number. The message is then transmitted to the address associated with the friend alias.

Although not shown in FIGS. 6–11, it will be appreciated that some method of identifying the transmitting PMU 105 can be included in the signal if necessary. For instance, the PMU address could be sent to identify the PMU 105. Alternatively, prior art methods such as transmitting on a given frequency or at a given time could be used. It will be further appreciated that canned messages can be added and deleted by the PMU 105 in the manner described for adding and deleting friends.

The signals transmitted by the PMU 105 to the system controller 110 over the wireless communication channel can be relatively short because the aliases are often significantly shorter in length than are the related addresses and messages. As a result, the likelihood of crowding the channel is minimized, rendering message delivery delays less likely.

Use of the aliases by the PMU 105 is also convenient for the user because the user does not have to memorize lengthy addresses of friends or enter large amounts of information every time a message is to be sent. For instance, the user only has to memorize a friend's name, e.g., Lou, rather than the friend's address, which could comprise a large number of characters that are not easily remembered. Additionally, the user only has to enter the word "Lou" to indicate the recipient. This eliminates situations in which the user has to continually reference a personal address book to recover a lengthy address, thereby saving time. Also, the likelihood of user error in typing lengthy addresses is minimized by using the aliases, thereby increasing the probability of error-free message delivery to the intended recipient.

Figure 12:
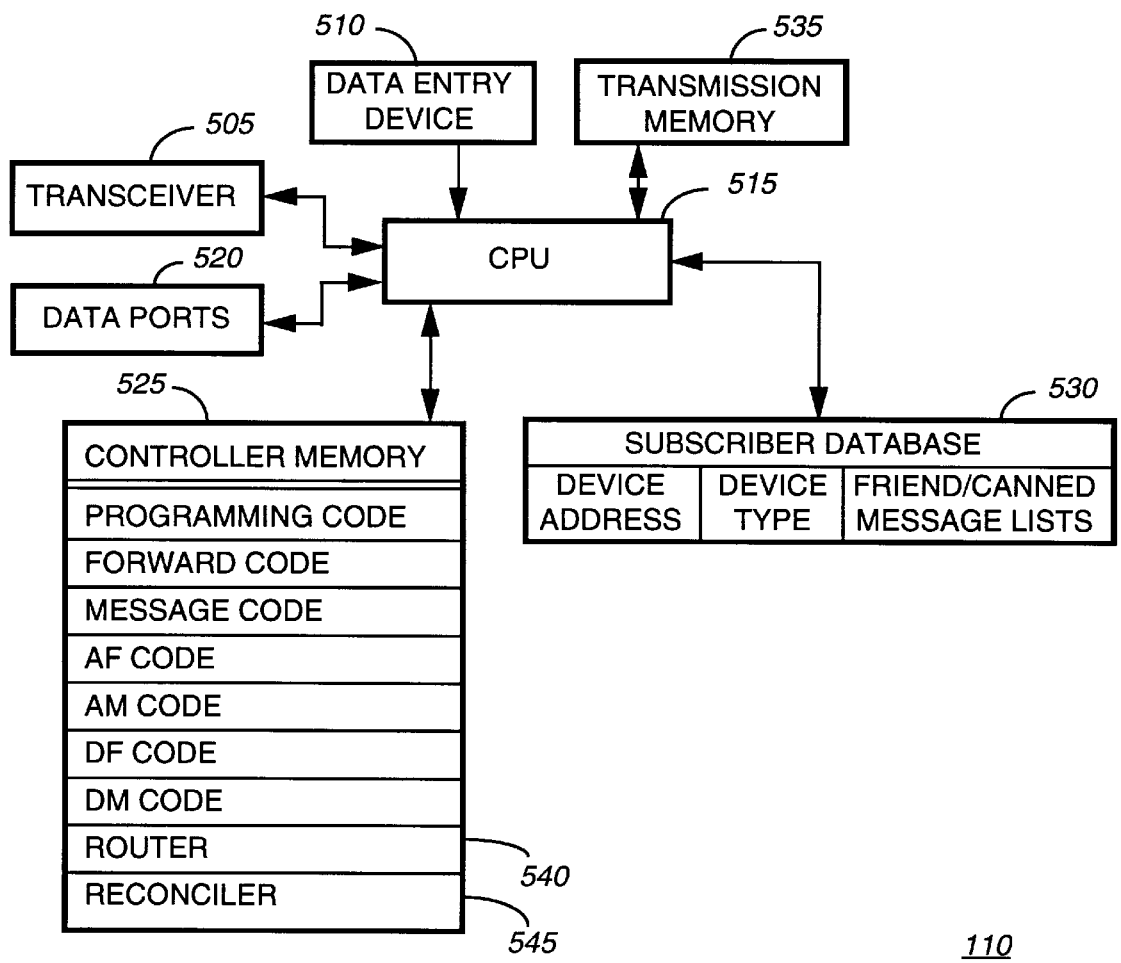
FIG. 12 is an electrical block diagram of the system controller included in the communication system of FIG. 1 according to the present invention.

FIG. 12 is an electrical block diagram of the system controller 110, which includes a transceiver 505 for sending and receiving information, a central processing unit (CPU) 515 for processing the information, and a transmission memory 535 for storing messages that are transmitted within the communication system 100 (FIG. 1). Data ports 520 are included in the controller 110 for transmitting messages to and receiving messages from wired devices, such as computers 115 (FIG. 1). The controller 110 can also be coupled by the data ports 520 to a telephone network, such as the public switched telephone network (PSTN), for receiving message information from message originators via telephones and modems. A subscriber database 530 is coupled to the CPU 515 for storing subscriber information, such as addresses of devices that subscribe for service within the system 100 and friend and message lists associated with subscribing PMUs. A data entry device 510 can be used to update the subscriber database 530.

The controller 110 also includes a controller memory 525 for storing information used in operating the controller 110. The controller memory 525 preferably stores the programming code, the forward code, the message code, and AF, AM, DF, and DM codes. A router 540 included in the controller 110 transmits messages within the communication system 100, and a reconciler 545 updates friend and message lists stored by the controller 110 and the PMUs within the communication system 100. Preferably, the router 540 and the reconciler 545 are firmware elements stored in the memory 525 and executed by the CPU 515 during operation of the controller 110. Alternatively, the router 540 and the reconciler 545 can be implemented as hardware capable of performing equivalent operations.

Figure 13:
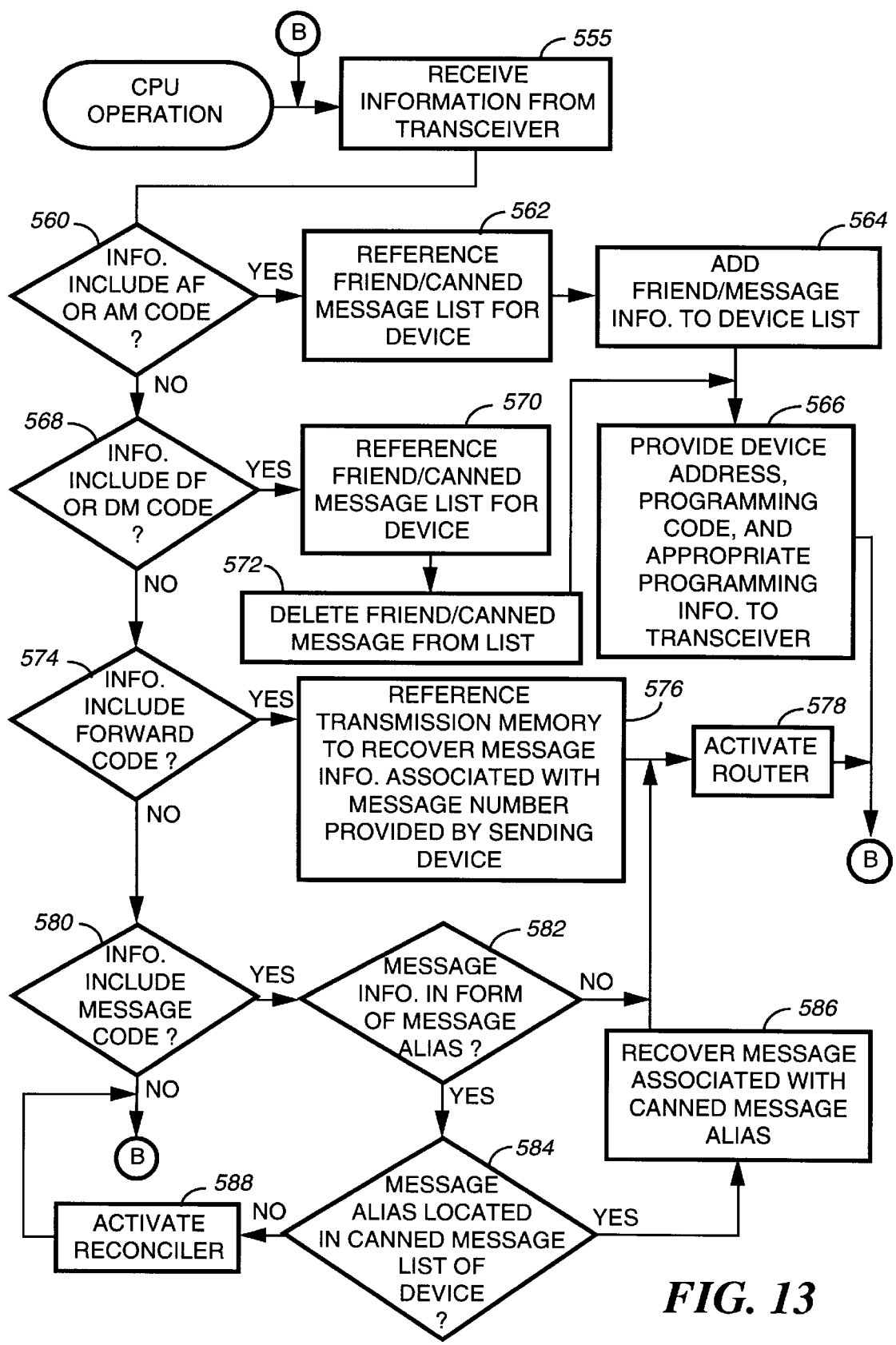
FIG. 13 is a flowchart illustrating an operation of a central processing unit (CPU) included in the system controller of FIG. 12 according to the present invention.

FIG. 13 is a flowchart of an operation performed by the CPU 515, which, at step 555, receives information from the transceiver 505. When, at step 560, the information includes an AF code or an AM code, indicating that the user of a PMU 105 wants to add a friend or message alias, the lists associated with that PMU 105 are referenced, at step 562, in the subscriber database 530. The friend or message information appended to the AM or AF code is then assigned an additional message alias or an additional friend alias and added, at step 564, to the appropriate list associated with the PMU 105.

When, at step 568, the information includes a DM or DF code, indicating that the user of the PMU 105 wishes to delete a friend or canned message from its memory, the lists associated with the PMU 105 are referenced, at step 570, and the entry associated with the incoming DM or DF code is deleted from the PMU's list in the subscriber database 530, at step 572. Once the CPU 515 has deleted information from or added information to the PMU's friend or canned message list maintained locally by the controller 110, at steps 564, 572, the CPU 515 proceeds to modify the database 230 (FIG. 2) stored by the PMU 105 accordingly. This is done by providing, at step 566, the PMU address, programming code, and appropriate programming information to the transceiver 505 for transmission to the PMU 105.

When, at step 574, the information received by the CPU 515 includes a forward code, indicating that the user of the PMU 105 is forwarding a previously received message, the transmission memory 535 is referenced, at step 576, to recover the message associated with the message number appended to the forward code. Thereafter, the router 540 is activated, at step 578.

When, at step 580, the information received by the CPU 515 includes a message code, indicating that the user of the PMU 105 is sending a message to another device, the CPU 515 determines, at step 582, whether the message information included in the incoming signal is in the form of a message alias. For example, the CPU 515 could actively search for a predetermined number of bits, e.g., five bits, in a predetermined location of the signal or for predetermined markers that indicate the start or end of a message alias. When no message alias is included, the router 540 is activated, at step 578. When a message alias is included in the signal from the PMU 105, the CPU 515 references, at step 584, the subscriber database 530 to determine whether the received message alias is included in the canned message list associated with the PMU 105. When it is, the message associated with the canned message alias is recovered, at step 586, and the router 540 is activated, at step 578. When the message alias is not located in the PMU's list, the reconciler 545 (FIG. 12) is activated, at step 588.

Figure 14:
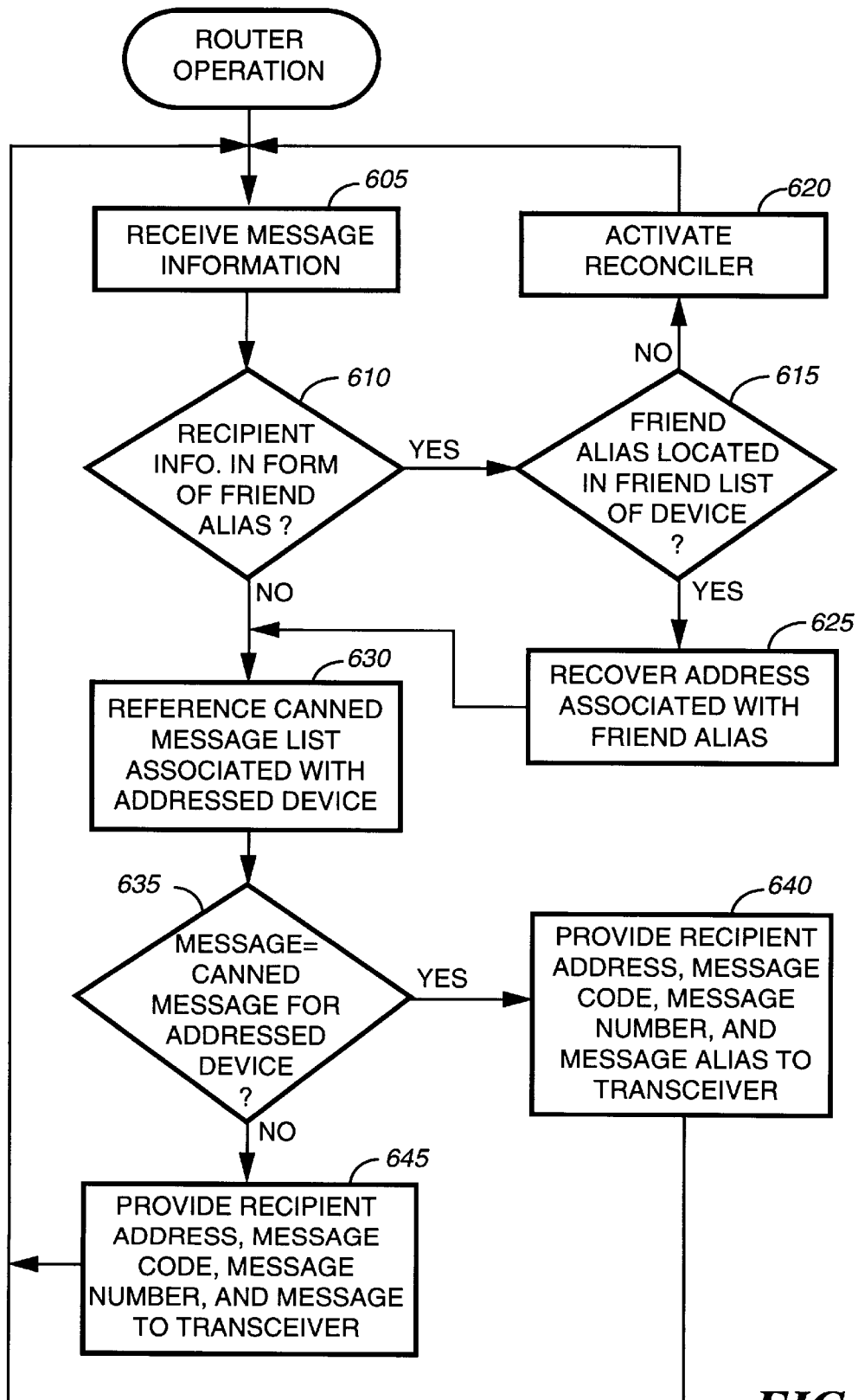
FIG. 14 is a flowchart depicting an operation of a router included in the system controller of FIG. 12 according to the present invention.

Referring next to FIG. 14, a flowchart depicts an operation of the router 540, which is activated by reception, at step 605, of message information comprising a message and recipient information. When, at step 610, the recipient information includes a friend alias, the router 540 determines, at step 615, whether the friend alias is included in the PMU's friend list stored in the subscriber database 530. When the friend alias is not included in the friend list, the reconciler 545 is activated, at step 620. When the friend alias is located, the address associated with the alias is recovered, at step 625, from the friend list.

Thereafter, at step 630, the canned message list for the recipient device is referenced. When, at step 635, the message to be sent to the device comprises a canned message stored in the device's list, the message alias representative of the message is recovered. The recipient address, the message code, the message number, and the message alias are then provided, at step 640, to the transceiver 505 for transmission to the recipient device, which can, for instance, comprise another PMU. When the message to be sent to the device is not a canned message, the message itself, rather than an alias, is provided to the transceiver 505 for transmission, at step 645.

Figure 15:
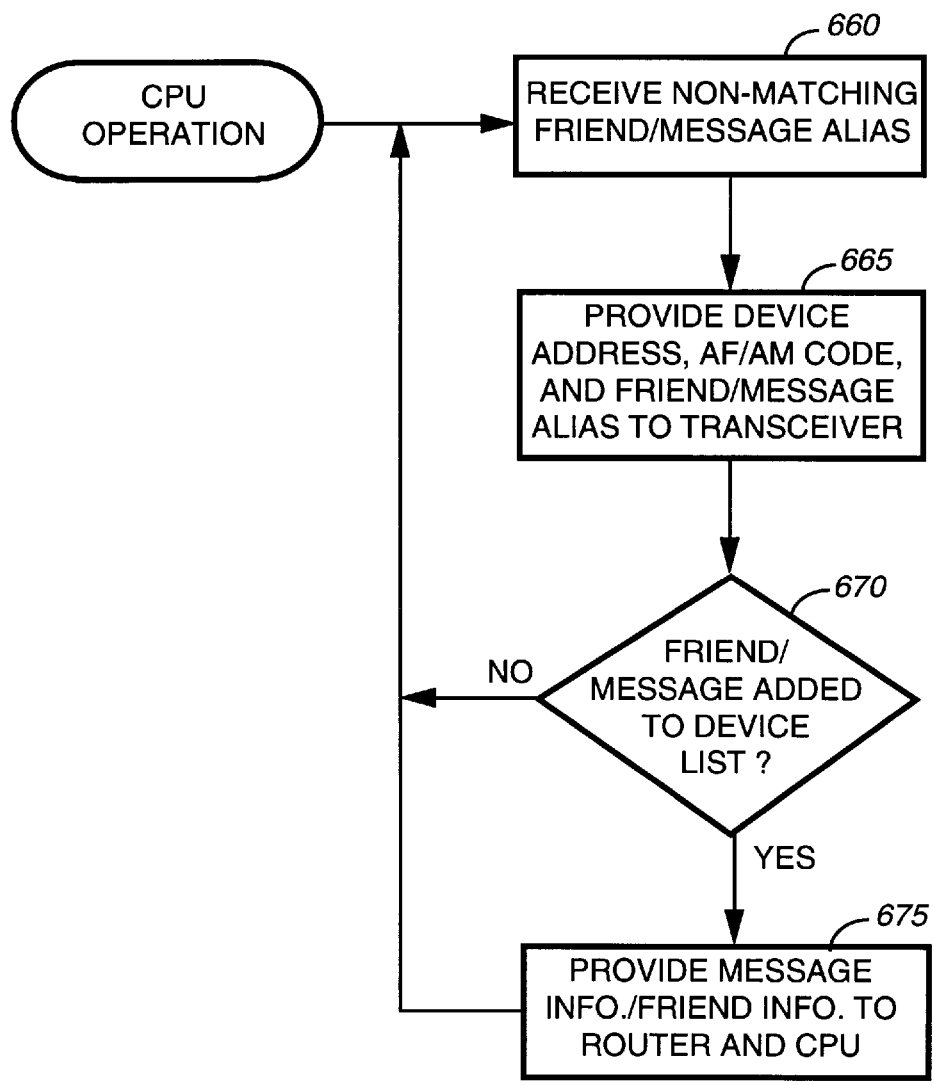
FIG. 15 is a flowchart depicting an operation of a reconciler included in the system controller of FIG. 12 according to the present invention.

FIG. 15 is a flowchart of an operation of the reconciler 545, which, at step 660, receives a non-matching friend or message alias, in response to which the address of the PMU 105 providing the non-matching alias, the AM or AF code, and the non-matching alias is provided to the transceiver 505 for transmission to the PMU 105. As mentioned above, reception by the PMU 105 triggers an inquiry at the PMU 105 to ask the user whether friend or message information is to be added for the alias that was previously transmitted by the PMU 105. The reconciler 545 then awaits subsequent reception of an AF or AM code to indicate that a friend or message is to be added to the PMU's list responsive to the inquiry. When an AF or AM code is received within a predetermined amount of time of the inquiry, indicating, at step 670, that a friend or message is to be added to the list, the message information or friend information is provided, at step 675, to the router 540 and the CPU 515. The router 540 and the CPU 515 can then process the alias that was previously not recognized, at step 584 (FIG. 13) and step 615 (FIG. 14).

In summary, the communication system described above includes a portable messaging unit for transmitting information to and receiving information from a system controller over a wireless communication channel. Because the wireless communication channel could become overcrowded by frequent transmissions of lengthy messages and addresses, the portable unit maintains lists of frequently used addresses and messages. Each entry in the lists is aliased with a code that is usually shorter than the referenced message or address. For instance, a very long message that is often transmitted could be aliased with a message alias comprising six bits, while a fairly lengthy address to which messages are often transmitted could be aliased with a recipient alias comprising five bits. Thereafter, when a message included in the message list is to be transmitted, the shorter message alias, rather than the message itself, is transmitted. When transmissions are to be made to a recipient included in the recipient list, the shorter recipient alias, rather than the address of the recipient, is transmitted. As a result, the communication channel is efficiently used to transmit relatively short transmissions, which prevents system capacity from being exceeded and which prevents message delays due to overcrowding of the channel.

The system controller also maintains the message and recipient lists associated with each portable messaging unit in the communication system. Therefore, the system controller recognizes recipient and message aliases transmitted by a portable unit. The controller, in response to reception of a recipient or message alias, references the sending unit's lists that are locally stored to recover the actual message or address that has been aliased. The message is then provided to the recipient device having the address. Alternatively, when the recipient device also is associated with message and recipient lists stored both by the device and the system controller, the system controller references the lists to determine whether the message to be sent is included in the message list of the recipient device. When so, an alias, rather than the more lengthy message, can be advantageously transmitted to the recipient device.

According to the present invention, the system controller maintains the recipient and message lists stored by portable units by programming the units over the air. Therefore, the probability of disagreement between the lists of the portable units and the lists maintained by the controller is minimized, which reduces the likelihood of missed or delayed messages resulting from unrecognized aliases. The user of a portable unit can conveniently add a recipient or message to his recipient or message lists by transmitting an "add" request, in response to which the controller assigns an additional alias and modifies the portable unit's list by over-the-air programming. When the user wishes to delete a frequent recipient or canned message, a "delete" request is transmitted, in response to which the controller deletes the selected entry from its locally maintained list and from the list stored in the portable unit. In this manner, the lists of the controller and the portable units are equivalent at any time, and situations do not result in which the user modifies the list and the portable unit, then forgets to modify the list at the controller.

Another advantage of the present invention is that the user is provided with a convenient way of entering message and address information. Specifically, the user does not have to remember relatively long addresses for entry into the portable messaging unit. Instead, the user only has to remember and enter a relatively short recipient alias or message designation rather than a lengthy address or message. Therefore, the likelihood of incorrectly entered addresses is minimized, which increases the probability of proper message delivery.

It will be appreciated by now that there has been provided a more efficient messaging system for transmitting message to and receiving messages from portable messaging units.

What is claimed is:

1. A communication system for providing two-way communication, the communication system comprising:

a portable messaging unit for sending a signal comprising a recipient alias over a wireless communication channel, the portable messaging unit comprises a list including names of recipients and recipient aliases associated therewith and further comprises a sender for requesting that an additional recipient be added to the list; and a controller for receiving the signal including the recipient alias and for transmitting a message to an address designated by the recipient alias, wherein the address is longer than the recipient alias, the controller includes a database in which the list associated with the portable messaging unit is also stored and further comprises a processing unit for assigning an additional recipient alias to the additional recipient and for adding the additional recipient alias and the additional recipient associated therewith to the list maintained by the portable messaging unit by transmitting programming information thereto.

2. A communication system for providing two-way communication, the communication system comprising:

a portable messaging unit for sending a signal comprising a recipient alias over a wireless communication channel, the portable messaging unit comprises a list including names of recipients and recipient aliases associated therewith and further comprises a sender for requesting that one of the recipients be deleted from the list; and a controller for receiving the signal including the recipient alias and for transmitting a message to an address designated by the recipient alias, wherein the address is longer than the recipient alias, the controller includes a database in which the list associated with the portable messaging unit is also stored and further comprises a processing unit for deleting the one of the recipients from the list maintained by the portable messaging unit by transmitting programming information thereto.

3. A communication system for providing two-way communication, the communication system comprising:

a portable messaging unit for sending a signal comprising a recipient alias over a wireless communication channel, the portable messaging unit comprises a list including names of recipients and recipient aliases associated therewith; and a controller for receiving the signal including the recipient alias and for transmitting a message to an address designated by the recipient alias, wherein the address is longer than the recipient alias, the controller includes a database in which the list associated with the portable messaging unit is also stored;

the controller further comprises:

a reconciler for determining that the recipient alias is not included in the list associated with the portable messaging unit; and a router coupled to the reconciler for inquiring of the portable messaging unit whether a recipient associated with the recipient alias is to be added to the list.

4. A communication system for providing two-way communication, the communication system comprising:

a portable messaging unit, comprises a list including messages and message aliases associated therewith, for sending a signal comprising a recipient alias and a message alias, rather than the message itself, and wherein the message is longer than the message alias, over a wireless communication channel, the portable messaging unit further comprises a sender for requesting that an additional message be added to the list maintained by both the portable messaging unit and the controller; and a controller, includes a database in which the list associated with the portable messaging unit is also stored, for receiving the signal including the recipient alias and for transmitting a message to an address designated by the recipient alias, wherein the address is longer than the recipient alias, the controller further comprises a processing unit for assigning an additional message alias to the additional message and for adding the additional message alias and the additional message associated therewith to the list maintained by the portable messaging unit by transmitting programming information thereto.

5. A communication system for providing two-way communication, the communication system comprising:

a portable messaging unit, comprises a list including messages and message aliases associated therewith, for sending a signal comprising a recipient alias and a message alias, rather than the message itself, and wherein the message is longer than the message alias, over a wireless communication channel, the portable messaging unit further comprises a sender for requesting that one of the messages be deleted from the list maintained by both the portable messaging unit and the controller; and a controller, includes a database in which the list associated with the portable messaging unit is also stored, for receiving the signal including the recipient alias and for transmitting a message to an address designated by the recipient alias, wherein the address is longer than the recipient alias, the controller further comprises a processing unit for deleting the one of the messages from the list maintained by the portable messaging unit by transmitting programming information thereto.

6. A communication system for providing two-way communication, the communication system comprising:

a portable messaging unit, comprises a list including messages and message aliases associated therewith, for sending a signal comprising a recipient alias and a message alias, rather than the message itself, and wherein the message is longer than the message alias, over a wireless communication channel; and a controller, includes a database in which the list associated with the portable messaging unit is also stored, for receiving the signal including the recipient alias and for transmitting a message to an address designated by the recipient alias, wherein the address is longer than the recipient alias, the controller further comprises:

a reconciler for determining that the message alias is not included in the list associated with the portable messaging unit; and a router coupled to the reconciler for inquiring of the portable messaging unit whether the message associated with the message alias is to be added to the list.

7. A method for providing two-way communication in a communication system comprising a portable messaging unit and a controller, the method comprising the steps of:

storing, in both the portable messaging unit and the controller, a recipient list including names of recipients and recipient aliases associated therewith and a message list including messages and message aliases associated therewith the portable messaging unit sending a signal comprising a recipient alias over a wireless communication channel;

the controller receiving the signal including the recipient alias and determining that an alias transmitted by the portable messaging unit is not included in the recipient list or the message list and inquiring of the portable messaging unit whether information associated with the alias is to be added to the recipient list or the message list; and the controller transmitting a message to an address designated by the recipient alias, wherein the address is longer than the recipient alias.

8. A method for providing two-way communication in a communication system comprising a portable messaging unit and a controller, the method comprising the steps of:

storing, in both the portable messaging unit and the controller, a recipient list including names of recipients and recipient aliases associated therewith and a message list including messages and message aliases associated therewith the portable messaging unit sending a signal comprising a recipient alias over a wireless communication channel and requesting that information be added to one of the recipient list and the message list maintained by both the portable messaging unit and the controller;

the controller receiving the signal including the recipient alias and assigning an additional alias to the information responsive to the requesting step and the controller transmitting a message to an address designated by the recipient alias, wherein the address is longer than the recipient alias and transmitting programming information to the portable messaging unit to add the additional alias and the information associated therewith to the one of the recipient list and the message list maintained by the portable message unit.

9. A method for providing two-way communication in a communication system comprising a portable messaging unit and a controller, the method comprising the steps of:

storing, in both the portable messaging unit and the controller, a recipient list including names of recipients and recipient aliases associated therewith and a message list including messages and message aliases associated therewith the portable messaging unit sending a signal comprising a recipient alias over a wireless communication channel and requesting that information be deleted from one of the recipient list and the message list maintained by both the portable messaging unit and the controller;

the controller receiving the signal including the recipient alias; and the controller transmitting a message to an address designated by the recipient alias, wherein the address is longer than the recipient alias and transmitting programming information to the portable messaging unit to delete the information from the one of the recipient list and the message list maintained by the portable messaging unit.

* * * * *